(12) United States Patent
Tamminga et al.

(10) Patent No.: US 9,751,055 B2
(45) Date of Patent: Sep. 5, 2017

(54) AUGER WITH CONTINUOUS KNIFE

(71) Applicant: Jay-Lor International Inc., East Garafraxa (CA)

(72) Inventors: Jakob Tamminga, East Garafraxa (CA); Gavin Mills, Hillsburgh (CA); Christopher Bessey, Fergus (CA)

(73) Assignee: JAY-LOR INTERNATIONAL INC., East Garafraxa, Ontario (CA)

( * ) Notice: Subject to any disclaimer, the term of this patent is extended or adjusted under 35 U.S.C. 154(b) by 481 days.

(21) Appl. No.: 14/308,330

(22) Filed: Jun. 18, 2014

(65) Prior Publication Data

US 2014/0374522 A1  Dec. 25, 2014

Related U.S. Application Data

(60) Provisional application No. 61/838,000, filed on Jun. 21, 2013.

(51) Int. Cl.
*B02C 19/22* (2006.01)
*B01F 7/24* (2006.01)
*B01F 7/00* (2006.01)
*A23N 17/00* (2006.01)
*A01K 5/00* (2006.01)
*A23K 10/37* (2016.01)

(52) U.S. Cl.
CPC ............... *B01F 7/24* (2013.01); *A01K 5/004* (2013.01); *A23K 10/37* (2016.05); *A23N 17/007* (2013.01); *B01F 7/00616* (2013.01); *B01F 7/241* (2013.01); *B02C 19/22* (2013.01); *Y02P 60/877* (2015.11)

(58) Field of Classification Search
CPC ............. B02C 19/22; B01F 7/24; B01F 7/241
USPC ....... 241/260.1, 101.761, 605, 300; 366/314, 366/318
See application file for complete search history.

(56) References Cited

U.S. PATENT DOCUMENTS 4,929,086 A * 5/1990 Geyer ................. B01F 13/1047
241/260.1
4,978,078 A * 12/1990 Vadnay ..................... B02B 3/06
241/14

(Continued)

FOREIGN PATENT DOCUMENTS

CA          2316092 A1    2/2001

*Primary Examiner* — Faye Francis
(74) *Attorney, Agent, or Firm* — Gilberto M. Villacorta; Kiri Sharon; Foley & Lardner LLP

(57) ABSTRACT

An auger is provided for cutting and mixing bulk fibrous feed placed into a mixing chamber of a mixer for eventual consumption by livestock. The auger comprises flighting have an outside edge defining the periphery of the auger. A knife is provided, connected to the periphery of the flighting in a continuous or substantially continuous manner along at least a major portion of the periphery of the flighting of the auger. The continuous or substantially continuous knife may include knife sections placed adjacent and substantially longitudinally to one another thereby providing a continuous or substantially continuous knife. The auger having the continuous or nearly continuous knife along the periphery provides a substantially clean cut of fibrous bulk material and a reduction in crushing and/or tearing of the fibrous material relative to an auger with a non-continuous knife or an auger with a serrated knife.

14 Claims, 5 Drawing Sheets

(56) References Cited

U.S. PATENT DOCUMENTS

| | | | | |
|---|---|---|---|---|
| 5,601,362 A | * | 2/1997 | Schuler | A01K 5/004 366/309 |
| 5,823,449 A | * | 10/1998 | Kooima | B01F 7/00008 241/101.761 |
| 5,984,218 A | | 11/1999 | Peat | |
| 6,092,750 A | | 7/2000 | Kooima et al. | |
| 6,863,433 B2 | * | 3/2005 | Knight | A01K 5/004 241/101.761 |
| 6,945,485 B1 | * | 9/2005 | Douglas | A01K 5/004 241/101.761 |
| 7,004,617 B2 | * | 2/2006 | Albright | A01K 5/004 241/101.761 |
| 7,507,016 B2 | * | 3/2009 | Huberdeau | A01K 5/004 241/101.761 |
| 7,871,024 B2 | * | 1/2011 | Peeters | A01C 3/06 239/667 |
| 8,100,578 B2 | * | 1/2012 | Ramhorst | B01F 7/00133 366/320 |
| 8,540,177 B2 | * | 9/2013 | Baker | A01K 5/004 241/101.761 |
| 8,646,715 B2 | * | 2/2014 | Pellman | B02C 18/18 241/101.76 |
| 2009/0296517 A1 | | 12/2009 | Tamminga | |

* cited by examiner

AUGER WITH CONTINUOUS KNIFE

CROSS REFERENCE TO RELATED APPLICATIONS

This application claims the benefit of U.S. Provisional Application No. 61/838,000 filed on Jun. 21, 2013, which is hereby incorporated by reference in its entirety.

FIELD OF THE INVENTION

The invention relates to bulk feed mixers and more specifically to bulk feed mixers and mini-mixers comprising augers having continuous or nearly continuous knives.

BACKGROUND

Bulk feed mixers are generally used to cut and mix fibrous bulk feed material placed into a mixing chamber of the mixer. The mixing chamber generally comprises an auger for cutting the fibrous material and mixing the bulk material in preparation for extraction from the mixing chamber and consumption by livestock. Proper cutting of the fibrous material is an important feature of the auger in order to maintain the nutrition value, such as the effective fibre, of the fibrous feed material and promote healthy livestock.

Fibrous feed material should ideally be cleanly cut during mixing in order to maintain the effective fibre of the feed. Crushing or tearing of the fibrous feed damages the feed and generally reduces the nutritional value, such as the effective fibre, of the feed produced.

Various bulk feed mixers employ knives on the auger to cut the fibrous material. One such auger employs a serrated knife placed generally at the corners of a square auger. However, the serrated knife has a tendency to tear the fibrous material resulting in a poor cut of the fibrous material and thereby reducing the nutritional value of the feed. This setup is especially poor at cleanly cutting fibrous material in a mini-mixer where there is a generally tendency for the bulk feed material to densely pack itself in the mixing chamber due to the proximity of the walls of the mixing chamber with the flighting of the auger.

A need therefore exists for an auger capable of more cleanly cutting fibrous material and maintaining the nutritional value of the fibrous feed or at least mitigating the reduction of the nutritional value during mixing and cutting of the feed.

SUMMARY

An auger is provided for either a bulk feed mixer or a bulk feed mini-mixer for cutting and mixing bulk fibrous feed placed into a mixing chamber of the mixer. The auger comprises flighting have an outside edge defining the periphery of the auger. A knife is provided, connected to the periphery of the flighting in a continuous or substantially continuous manner along at least a major portion of the periphery of the flighting of the auger. The continuous or substantially continuous knife may be comprised of knife sections placed adjacent and substantially longitudinally one another thereby providing a continuous or substantially continuous knife. The adjacent knife segments may overlap each other at the point of connection thereby both reducing the number of connectors required and strengthening the connection between adjacent knife sections. The auger having the continuous or nearly continuous knife along the periphery provides a substantially clean cut of fibrous bulk material and a reduction in crushing and/or tearing of the fibrous material relative an auger with a non-continuous knife or an auger with a serrated knife.

In one embodiment, the present invention provides for an auger for a bulk feed mixer, the auger comprising:
  an auger post;
  flighting extending from the auger post and comprising a outer edge defining the periphery of the flighting, the bottom of the flighting ending in a leading edge spanning from the outer edge to the auger post; and
  a knife positioned on the periphery of the flighting.

In a further embodiment of the auger outlined above, the knife positioned on the periphery of the flighting is a continuous knife.

In a further embodiment of the auger outlined above, the continuous knife is comprised of a plurality of knife sections placed adjacent and substantially longitudinally to each other to form a continuous knife.

In a further embodiment of the auger outlined above, a knife section overlaps an adjacent knife section and is connected to the flighting in the overlapping region.

In a further embodiment of the auger outlined above, the knife sections are connected to the flighting with a flush fastening connector.

In a further embodiment of the auger outlined above, the knife sections are connected to the flighting with a weld nut and the knife section comprises a recess for at least partially accommodating the flange on the weld nut so that, after connection, the external surface of the weld nut is flush or nearly flush with the surface of the knife.

In a further embodiment of the auger outlined above, the continuous knife comprises a non-serrated sculpted blade.

In a further embodiment of the auger outlined above, the continuous knife comprises a scalloped blade or a wavy double bevel blade.

In a further embodiment of the auger outlined above, the underside of the outer edge of the auger flighting is beveled.

In a further embodiment of the auger outlined above, the auger is a square auger.

In a further embodiment of the auger outlined above, the knife sections are substantially straight sections along the periphery of the outer edge of the flighting.

In a further embodiment of the auger outlined above, the auger is for a mini-mixer.

In another embodiment, the present invention provides for a bulk feed mixer comprising one or more augers.

In another embodiment, the present invention provides for a bulk feed mini-mixer comprising one or more augers.

DETAILED DESCRIPTION

The following are non-limiting examples of an auger having a continuous knife for use in a bulk feed mixer and are not intended to indicate essential features of the invention but are for illustrative purposes.

Figure 1:
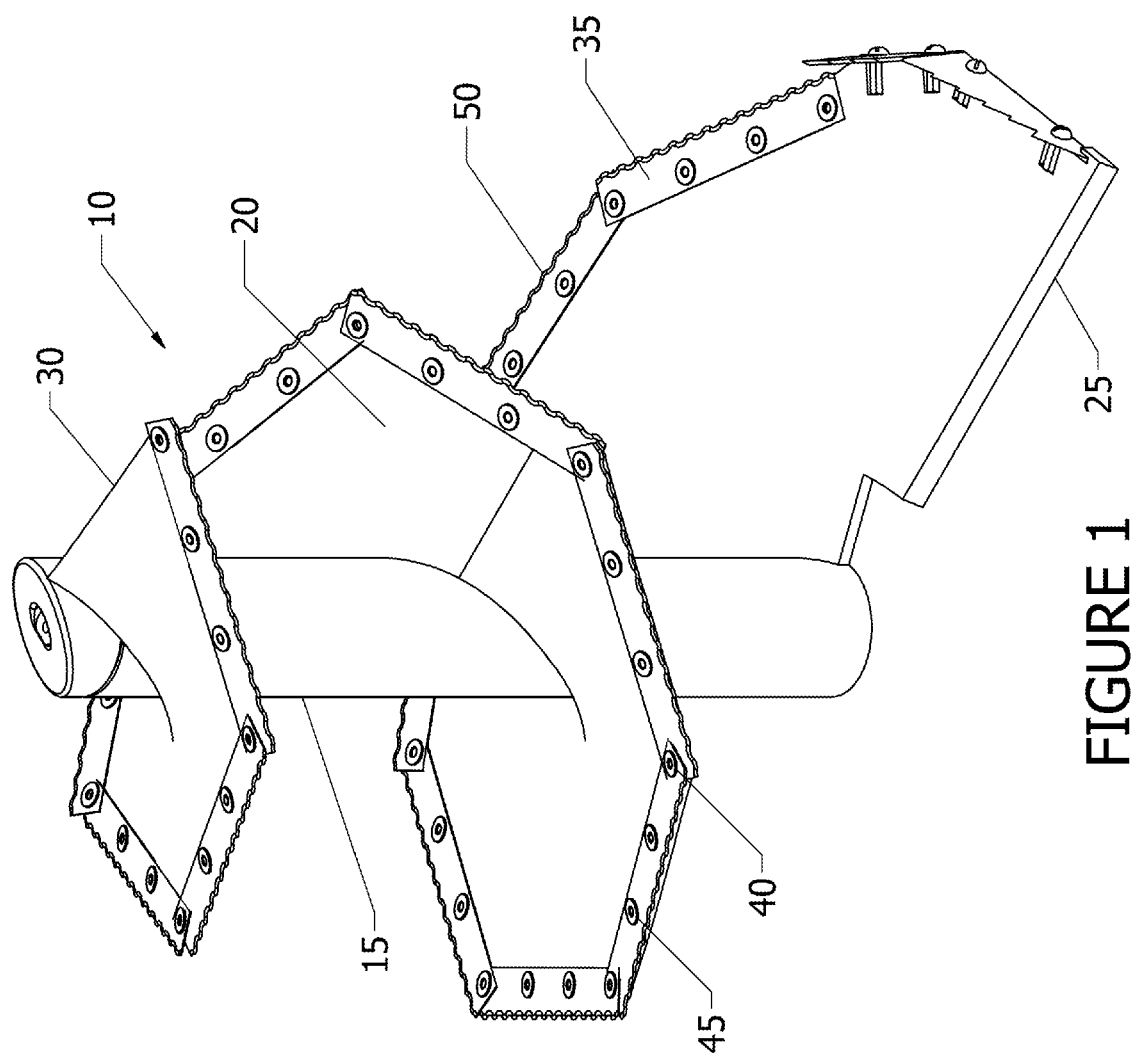
FIG. 1 is an isometric view illustrative of an embodiment of a square auger for a bulk feed mixer or mini-mixer comprising a continuous knife on the periphery of the flighting of the auger.
Figure 2:
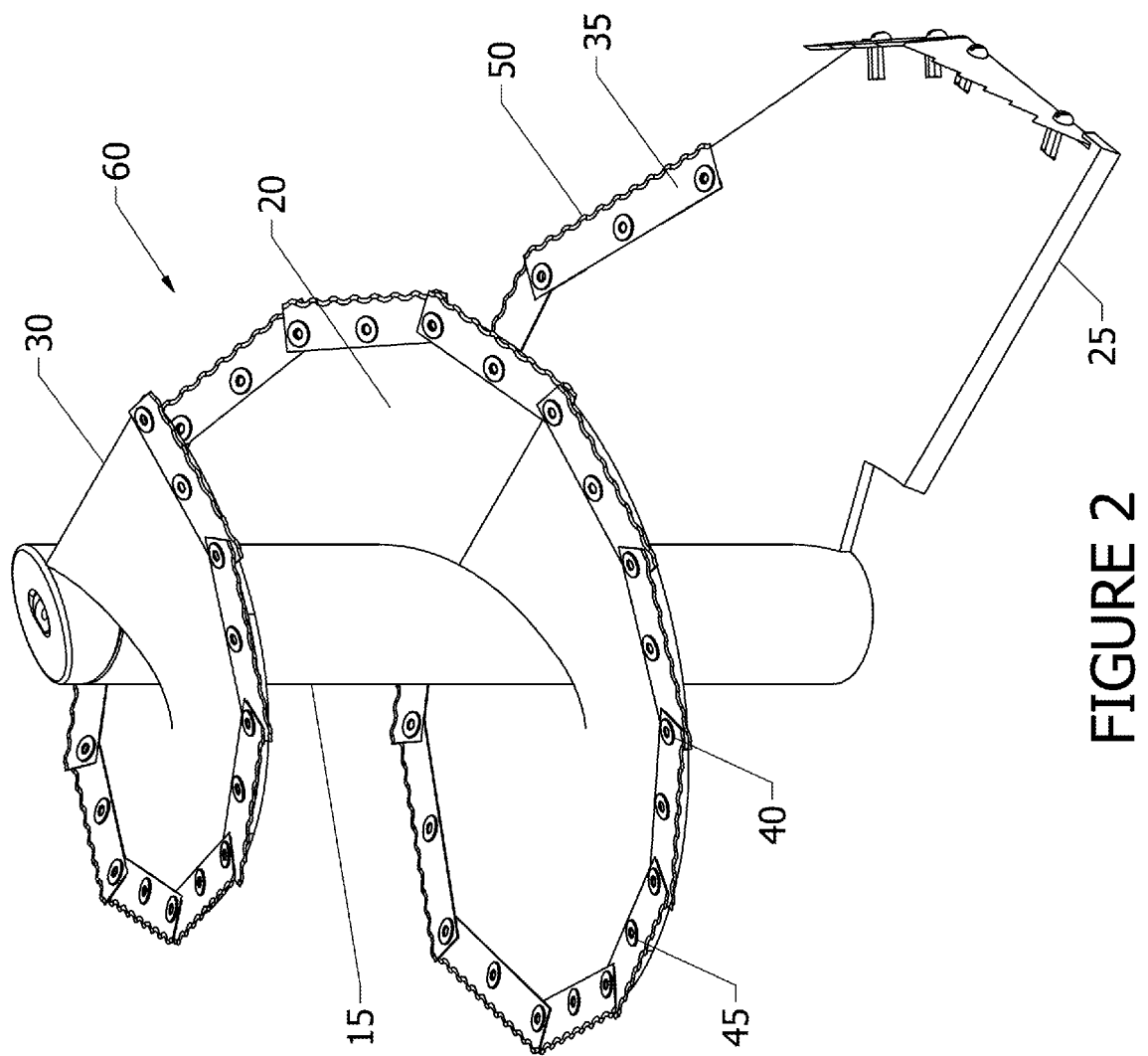
FIG. 2 is an isometric view illustrative of an embodiment of a round auger for a bulk feed mixer or mini-mixer comprising a continuous knife on the periphery of the flighting of the auger.
Figure 3:
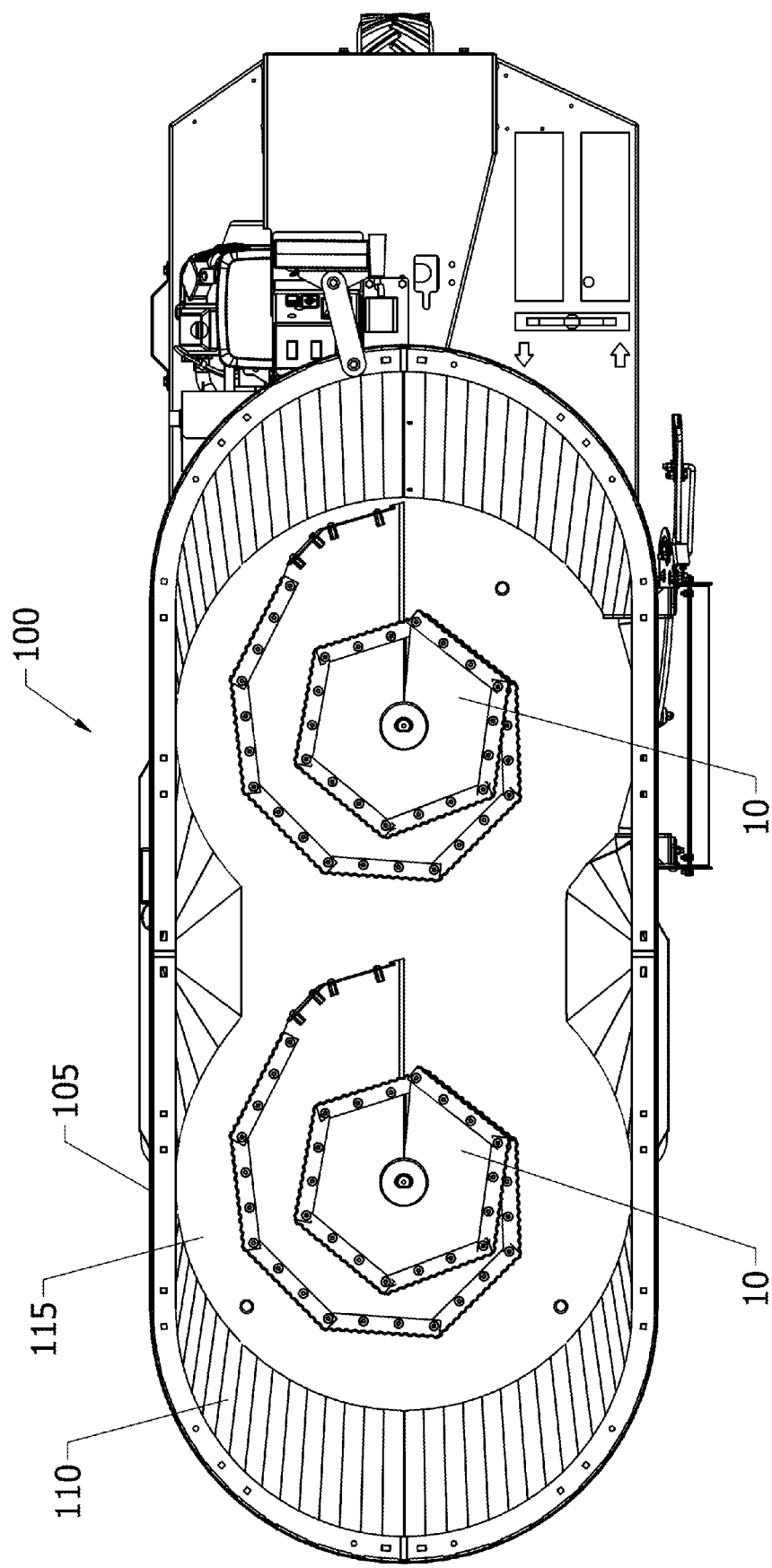
FIG. 3 is a top view illustrative of a bulk feed mixer comprising a dual square auger setup of square augers comprising a continuous knife on the periphery of the flighting of the auger.

FIGS. 1 and 2 show various augers for use with a bulk feed mixer, including a bulk feed mini-mixer, wherein the auger includes a continuous knife along at least a substantial portion of the periphery or outer edge of the flighting of the auger. FIG. 1 is an illustrative example of a square cut auger shown generally at 10 while FIG. 2 is an illustrative example of a round auger shown generally at 60. The auger 10, 60 comprises an auger post 15 about which flighting 20 extends for mixing bulk feed material placed in the mixing chamber (shown in FIG. 3 at 105) of a bulk feed mixer (shown generally in FIG. 3 at 100). A knife is typically installed on each level of the flighting 20 or at each corner of the flighting 20 to facilitate cutting of fibrous material in the bulk feed. However, typical knives and knife positioning on the flighting has a tendency to crush and/or tear the fibrous material thereby reducing the effective fibre of the feed material. Further, typical knives and knife positioning on the flighting does not cleanly slice through bulk material placed in the mixing chamber resulting in the need for more powerful motors to turn the auger and more fuel or power consumption. More time may also be required to properly cut a bale of fibrous bulk material placed in the mixing chamber. This is especially apparent when a mini-mixer is used as the bulk fibrous material tends to be more densely packed in the mixing chamber.

As would be appreciated, the auger 10, 60 includes an outer edge 30 of the flighting that defines a periphery of the auger 10, 60. A square cut auger 10 includes straight edged sections along the periphery of the flighting 20 while a round auger 60 has a generally rounded or curved periphery substantially lacking defined corners. It will be appreciated that a square cut auger 10 such as that shown in FIG. 1 does not necessary have only four sides per level of the flighting but merely reflects an auger that includes straight or substantially straight sections along the periphery of the flighting. For example, an auger that includes more or less than four distinct sides on the periphery of the flighting is also included and referred to as a square cut auger.

A continuous knife is secured to at least a substantial portion of the outer periphery of the auger flighting 20 for cutting bulk material such as fibrous feed material during operation of the auger in a mixing chamber of a bulk feed mixer. As the flighting passes through and mixes bulk material, such as hay, placed in the mixing chamber the continuous knife cuts the bulk material in a relatively clean manner thereby mitigating the crushing or tearing damage to fibrous material and reducing the amount of effective fibre lost during mixing and cutting of the feed.

It will be appreciated that the continuous knife may be nearly continuous so long as it substantially covers the periphery of the outer edge of the flighting. For example, the continuous knife may include small sections, for example at the corners of a square cut auger, where a gap in the continuous knife is located. Further, the upper most region of the flighting 20 and/or the lower most region of the flighting 20 such as the region adjacent the leading edge 25 may not include the continuous knife.

In one embodiment, such as those shown in FIGS. 1 and 2, the continuous knife may be comprised of a plurality of knife sections 35 placed adjacent and substantially longitudinally aligned along the periphery of the auger 10, 60. Each adjacent knife section 35 is placed at a small angle relative its adjacent knife section 35 to accommodate the curve in a round auger or the angle or corner in a square cut auger. It should be appreciated that the substantially longitudinal alignment along the periphery of a square cut or rounded auger necessitates this angle and this angle is within the scope of the usage of the term "substantially longitudinal". The adjacent knife section 35 form the continuous knife and may include small gaps between various adjacent knife sections 35. Alternatively, the knife sections 35 may abut adjacent knife sections 35. Alternatively again, adjacent knife section 35 may overlap one another as shown in FIGS. 1 and 2.

The continuous knife may also be comprised of a single knife section that spans substantially at least a majority of the periphery of the auger 10, 60.

Figure 4A:
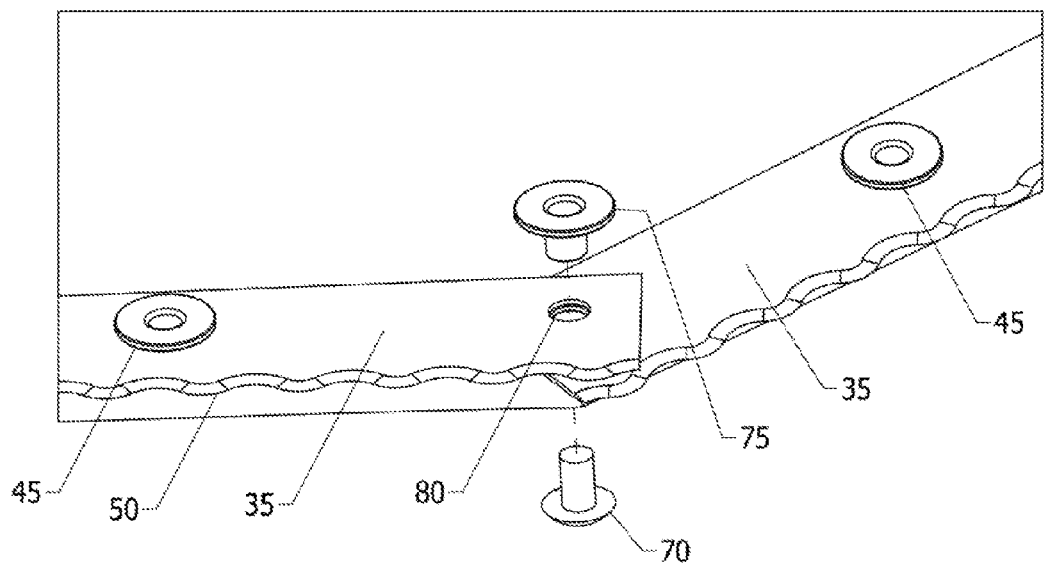
FIGS. 4A and 4B are exploded isometric views illustrative of one or more embodiments for connecting knife segments of a continuous knife for an auger of a bulk mixer or mini-mixer.
Figure 4B:
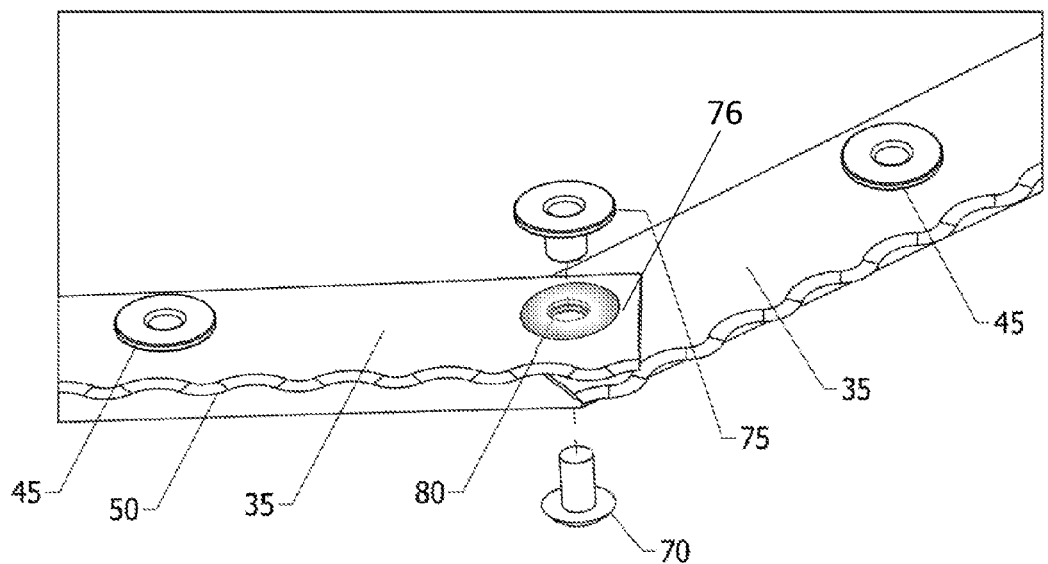

Knife sections 35 may be connected to the flighting 20 using any suitable means as would be appreciated including welding and/or various fasteners as shown in FIGS. 4A and 4B. In one embodiment, such as that shown, a weld nut 75 is used to receive a bolt or screw 70 via a connector hole 80 in the knife section 35 and the flighting 20. To further strengthen the connection as well as the junction between adjacent knife sections 35, the overlapping section of the adjacent knife sections 35 may include a connector as shown in FIGS. 4A and 4B. A connector hole 80 bisects the overlapping knife sections 35 as well as the flighting 20 and accommodates a connector such as for example a weld nut 75 and a bolt or screw 70. In one non-limiting embodiment, the knife section 35 may further include a recessed area 76 as shown in FIG. 4B around the connector hole 80 for accommodating a portion or all of the thickness of the flange on the weld nut 75 or other suitable connector thereby resulting in a flush or nearly flush surface after installation of the weld nut 75.

To further enhance the quality of the cut provided by the continuous knife, the edge of the continuous knife may include non-serrated feature on the knife edge such as the knife edge being scalloped, or including a bevel, wavy bevel or wavy double bevel (WDB) with a hardened edge. It has been observed that a scalloped edge or WDB edge on the continuous knife has allowed for a more clean cut of fibrous material placed in the mixing chamber resulting in a more efficient cutting of the fibrous material allowing for a reduction in horsepower required for operating the auger, a reduction in fuel consumption and/or a reduction in the time required to process a given amount of bulk fibrous material. This reduction may therefore allow for a more efficient and/or more cost effective processing of a given amount of bulk feed material.

Figure 5:
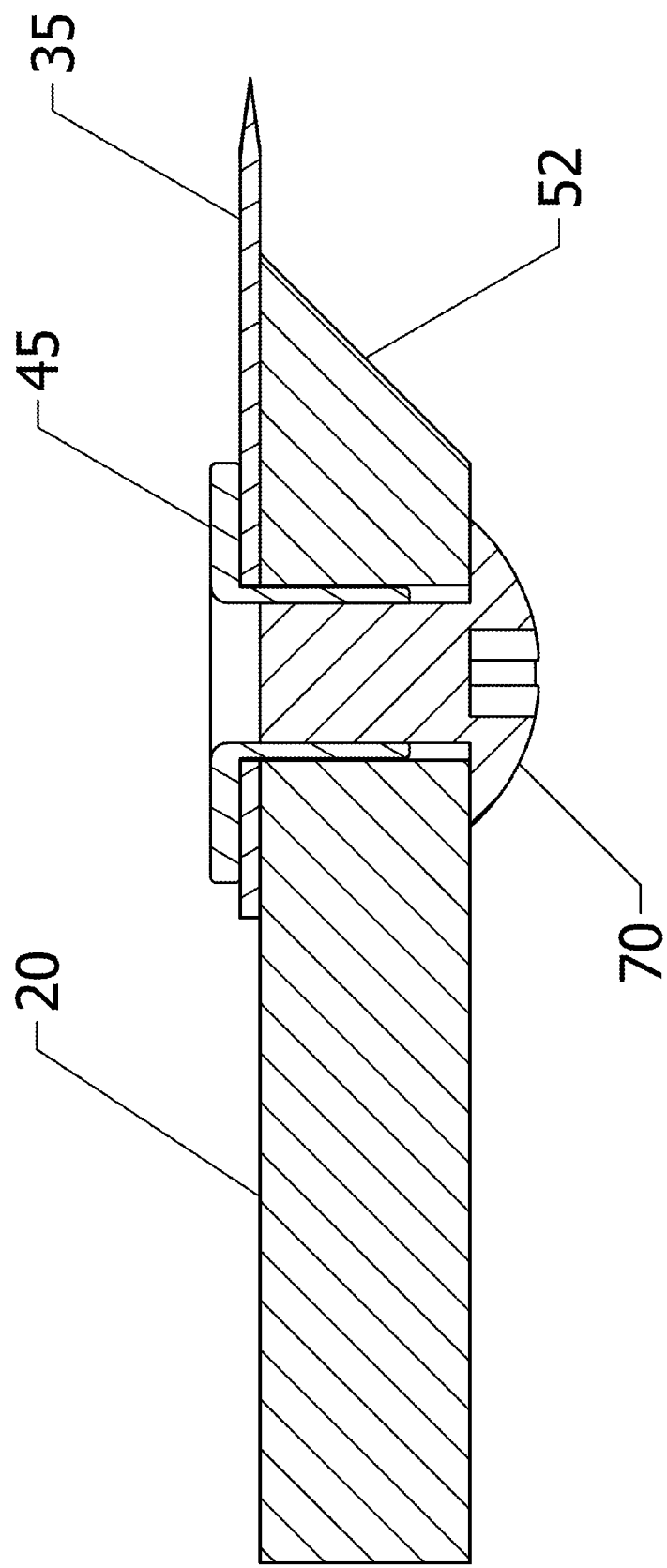
FIG. 5 is a schematic view illustrative of one embodiment of for connecting knife segments of a continuous knife for an auger of a bulk mixer or mini-mixer.

In one non-limiting example, the continuous knife or the knife sections 35 may have a blade thickness of about 0.1 inches or less. In another non-limiting example, the continuous knife or the knife sections 35 may have a blade thickness of about 0.5 inches or less. The blade of the continuous knife or knife sections 35 may be sufficiently thin to facilitate slicing through bulk material such as feed or fibrous feed more easily thereby resulting in a more efficient operation of the auger and/or a cleaner cut thereby mitigating damage to the effective fibre. In addition, as shown in FIG. 5, the underside 52 of the outer edge 30 of the auger 10, 60 may be beveled to further reduce accidental snagging of the auger with bulk material in the mixing chamber such as bulk fibrous feed material.

It will also be appreciated that the periphery of the auger flighting 20 may be sharpened along the continuous or nearly continuous length of the outer edge 30 thereby integrating the continuous knife directly into the auger flighting 20.

It will be appreciated that the continuous knife may include portions of the edge that are scalloped or may include an edge that is all or nearly fully scalloped. It will also be appreciated that the type and/or rate of scalloping is not a limiting feature, however, a serrated edge when compared to a scalloped edge, tends to tear fibrous material and a distinction should be made between a serrated edge and a scalloped edge as would be appreciated by those of skill in the art.

It will also be appreciated that an auger, such as those described herein, may be used in a bulk feed mixer or a bulk feed mini-mixer, and the size of the auger, auger post and auger flighting is understood to be scaled as necessary for a given application. It will be appreciated that reference to a mini-mixer used herein includes any mixer for bulk material wherein the volume of material that the mixer chamber can accommodate is lower than that of a bulk mixer.

Although the description herein refers to bulk feed material and bulk fibrous material, it will be appreciated that any suitable bulk material may be mixed and/or cut in the mixing chamber using an auger as illustrated herein and the augers and mixers referred to herein are not limited to the sole use of mixing and cutting bulk material, bulk feed material and/or bulk fibrous feed material.

It will also be understood that reference to the knife sections being placed adjacent and substantially longitudinally refers to the slight angle necessary between adjacent knife segments required to position the knife segments along the periphery of either a square cut auger or round auger and the usage of the term "substantially longitudinally" is intended to include this slight angle.

Various modifications, adaptations, and/or alterations may be made to the augers and/or mixers disclosed herein that are within the scope and spirit of the contemplated invention.

We claim:

1. An auger for a bulk feed mixer, the auger comprising:
an auger post;
flighting extending from the auger post and comprising an outer edge defining a periphery of the flighting, a bottom of the flighting ending in a leading edge spanning from the outer edge to the auger post; and
a knife positioned on the periphery of the flighting,
wherein the knife is a continuous knife,
wherein the knife is comprised of a plurality of knife sections placed adjacent and substantially longitudinally to each other to form the continuous knife, and
wherein a knife section of the plurality of knife sections overlaps an adjacent knife section of the plurality of knife sections and is connected to the flighting in an overlapping region.

2. The auger of claim 1, wherein the knife sections are connected to the flighting with a flush fastening connector.

3. The auger of claim 1, wherein the knife sections are connected to the flighting with a weld nut and the knife section comprises a recess for at least partially accommodating a flange on the weld nut so that, after connection, an external surface of the weld nut is flush or nearly flush with a surface of the knife.

4. The auger of claim 1, wherein the knife comprises a non-serrated sculpted blade.

5. The auger of claim 1, wherein the knife comprises a scalloped blade or a wavy double bevel blade.

6. The auger of claim 1, wherein an underside of the outer edge of the flighting is beveled.

7. The auger of claim 1, wherein the auger is a square auger.

8. The auger of claim 1, wherein the knife sections are substantially straight sections along a periphery of the outer edge of the flighting.

9. The auger of claim 1, wherein the auger is installed in a mini-mixer.

10. A bulk feed mixer comprising one or more augers as defined in claim 1.

11. The bulk feed mixer of claim 10, wherein the bulk feed mixer is a vertical mixer.

12. A bulk feed mini-mixer comprising one or more augers as defined in claim 1.

13. The bulk feed mini-mixer of claim 12, wherein the bulk feed mini-mixer is a vertical mixer.

14. The auger of claim 1, wherein the auger is installed in a vertical bulk feed mixer.

* * * * *